Figure 1:
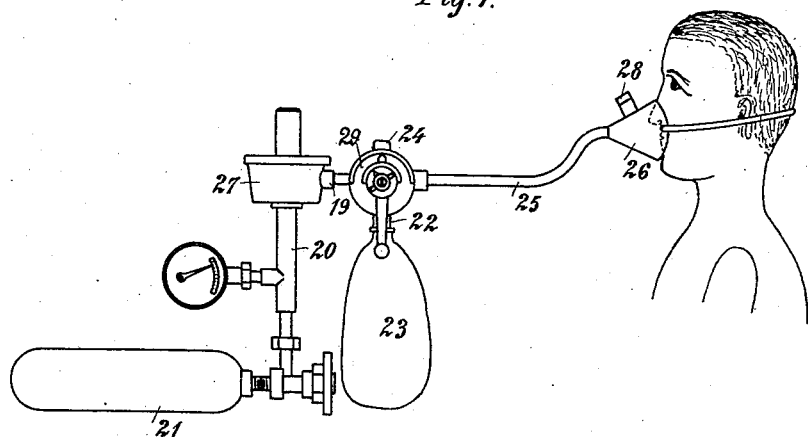
Figure 5:
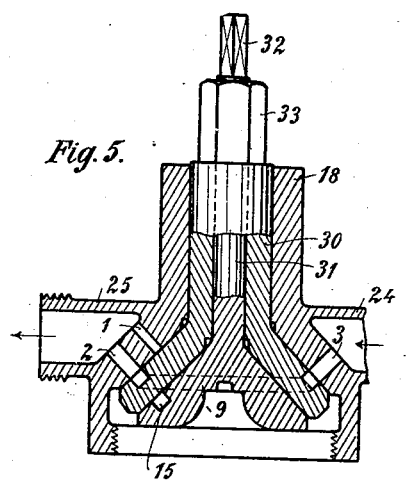

H. BRAT.
COMBINED RESPIRATOR AND INHALER.
APPLICATION FILED MAY 12, 1908.

912,532.

Patented Feb. 16, 1909.
9 SHEETS—SHEET 1.

H. BRAT.
COMBINED RESPIRATOR AND INHALER.
APPLICATION FILED MAY 12, 1908.
912,532.
Patented Feb. 16, 1909.
9 SHEETS—SHEET 2.
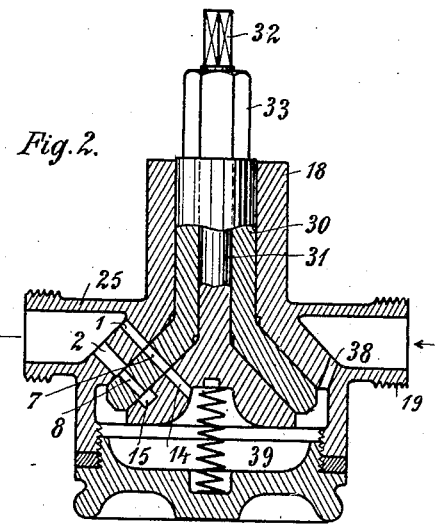
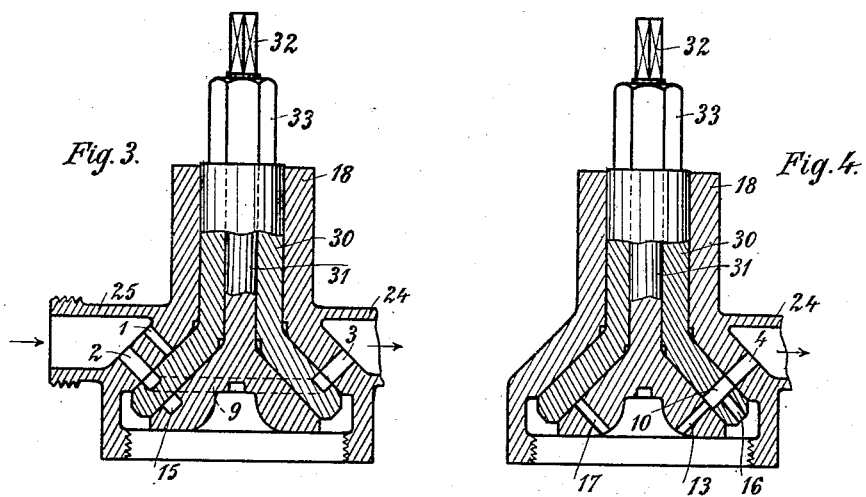

H. BRAT.
COMBINED RESPIRATOR AND INHALER.
APPLICATION FILED MAY 12, 1908.

912,532.

Patented Feb. 16, 1909.
9 SHEETS—SHEET 3.

Witnesses:
W. R. Schulz
August Miner

Inventor:
Heinrich Brat
by his attorney
Frank v. Briesen

THE NORRIS PETERS CO., WASHINGTON, D. C.

H. BRAT.
COMBINED RESPIRATOR AND INHALER.
APPLICATION FILED MAY 12, 1908.

912,532.

Patented Feb. 16, 1909.
9 SHEETS—SHEET 4.

Witnesses:
W. R. Schulz.
August Miner.

Inventor:
Heinrich Brat
by his attorney
Frank Bremen

THE NORRIS PETERS CO., WASHINGTON, D. C.

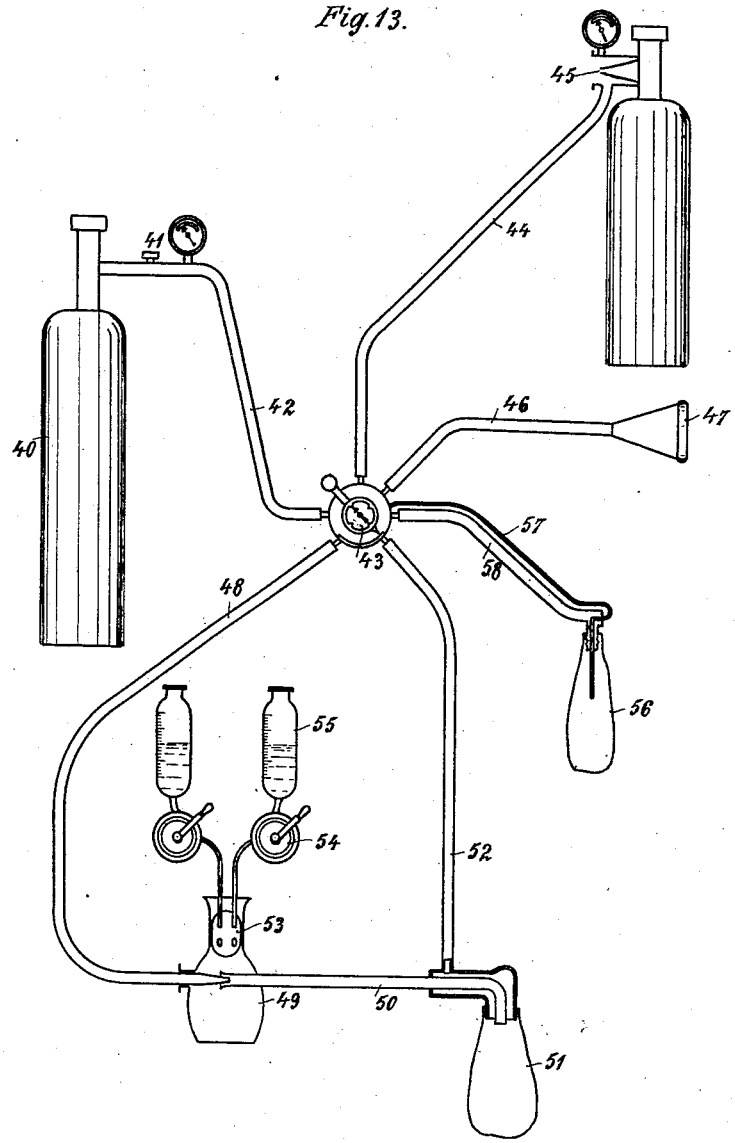

H. BRAT.
COMBINED RESPIRATOR AND INHALER.
APPLICATION FILED MAY 12, 1908.
912,532.
Patented Feb. 16, 1909.
9 SHEETS—SHEET 6.
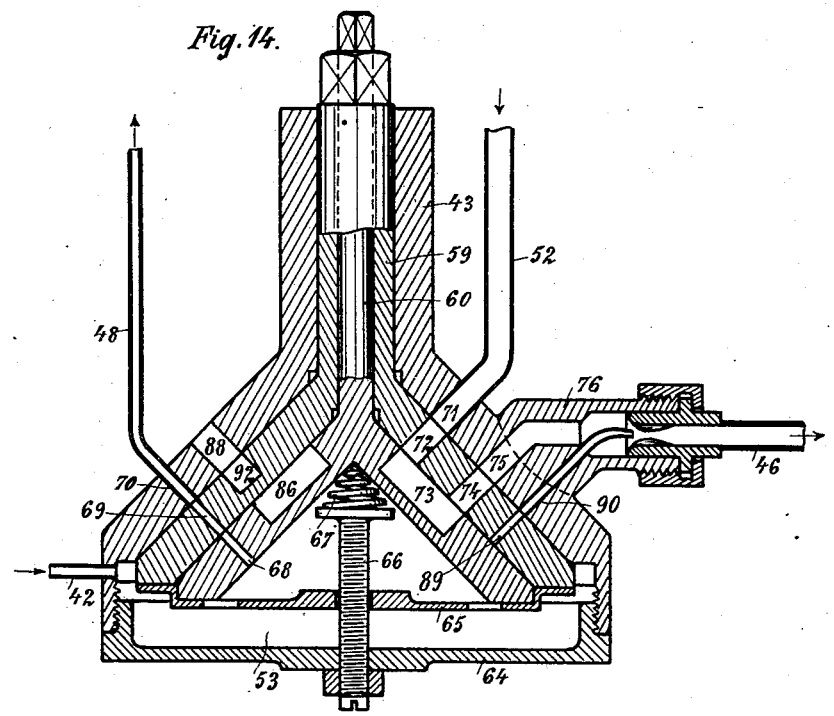
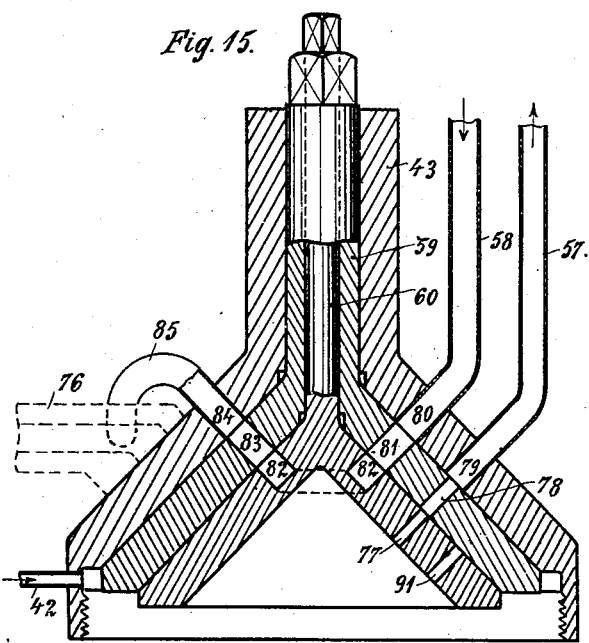

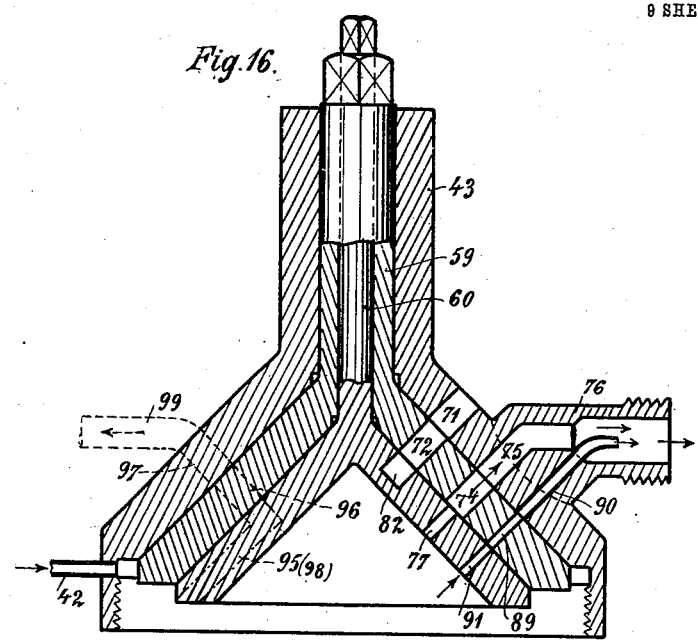
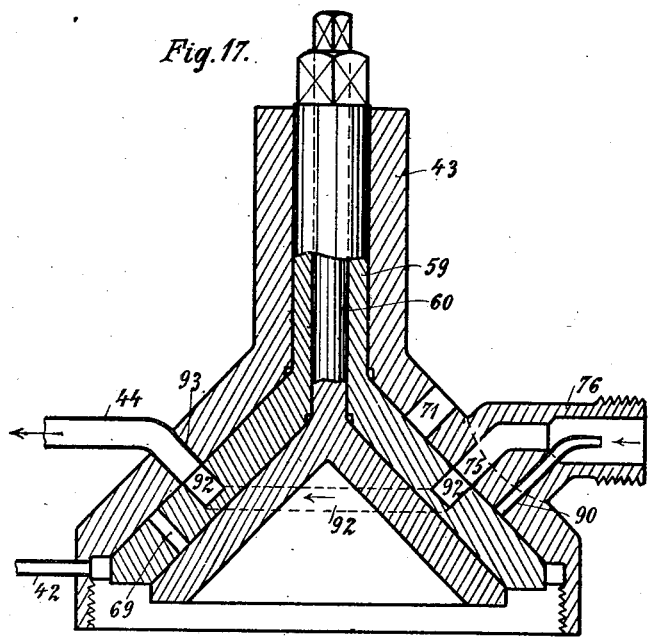

H. BRAT.
COMBINED RESPIRATOR AND INHALER.
APPLICATION FILED MAY 12, 1908.
912,532.
Patented Feb. 16, 1909.
9 SHEETS—SHEET 8.
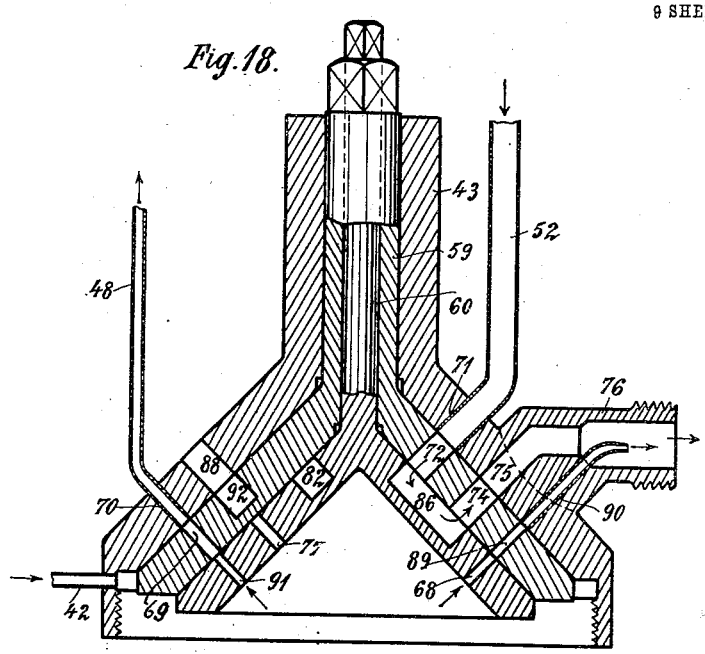
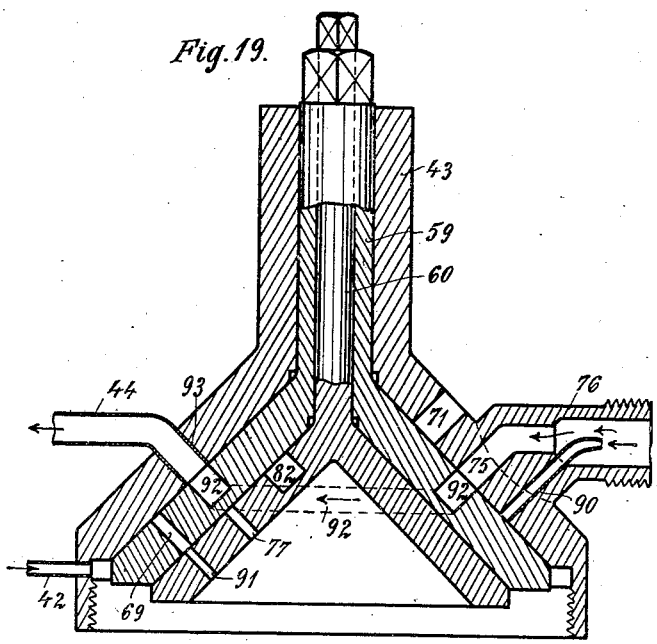

H. BRAT.
COMBINED RESPIRATOR AND INHALER.
APPLICATION FILED MAY 12, 1908.
912,532.
Patented Feb. 16, 1909.
9 SHEETS—SHEET 9.
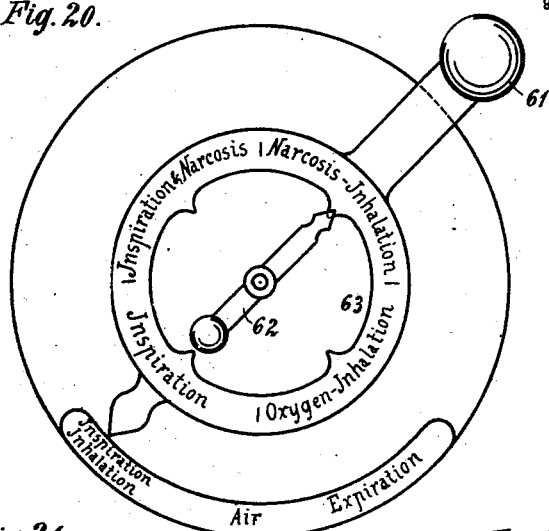
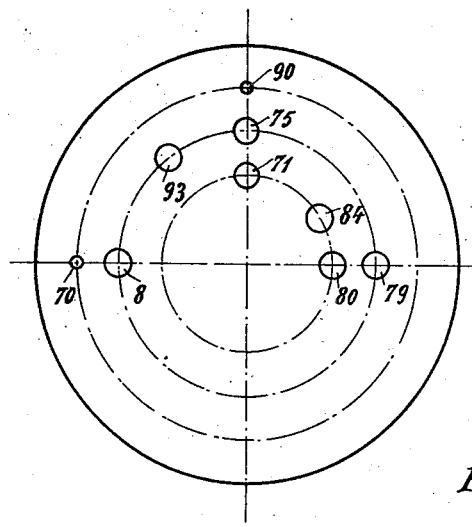
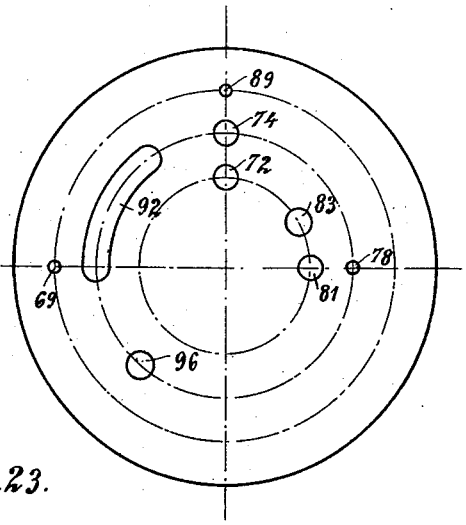
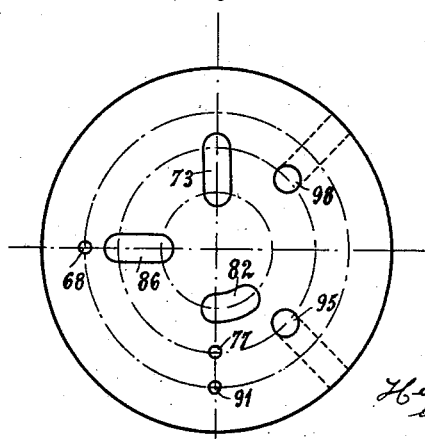

UNITED STATES PATENT OFFICE.

HEINRICH BRAT, OF CHARLOTTENBURG, GERMANY.

COMBINED RESPIRATOR AND INHALER.

No. 912,532.　　　　Specification of Letters Patent.　　　Patented Feb. 16, 1909.

Application filed May 12, 1908. Serial No. 432,398.

*To all whom it may concern:*

Be it known that I, HEINRICH BRAT, a doctor of medicine and a subject of the King of Prussia, and a resident of 18 Wieland-strasse, in the city of Charlottenburg, Kingdom of Prussia, and German Empire, have invented a certain new and useful Combined Respirator and Inhaler, of which the following is a specification.

In the case that, on account of the absorption of poisonous gases, the patient has nearly ceased to respire in a natural manner, the evacuation of said gases from the lung (expiration) as well as the supply of oxygen (inspiration) must be produced in an artificial way. It may be tried, to exercise these functions in a known manner by moving the arms of the patient etc. But this attempt will not have the wished for success in most cases, the success depending on several conditions. Firstly the movements must be practiced by a person having experience in this respect, and secondly it is impossible to produce artificial respiration by moving the limbs of the patient, if the latter one has suffered exterior lesions, for example broken arms etc. Therefore apparatus have been constructed which enable respiration to be induced artificially by turning a three way cock into the position in which it makes communication alternately between a bottle containing a suitable gas under pressure, such as oxygen, and the respiratory organs, and between a source of reduced pressure and the said organs. Such apparatus, however, can only be used with advantage when the patient is in such a condition that respiration has ceased, or is so superficial that it can be influenced by the mechanism of the artificial respiration. The more, however, consciousness has returned, the more automatic does the natural respiration become, and the more difficult is artificial respiration to be induced. Notwithstanding, the duct supplying oxygen may still be necessary, as without this the dangerous condition may remain. The mentioned apparatus, therefore, is wanting in the appropriate and absolutely desirable adaptability to the different requirements, which are to be fulfilled during an attempt at restoring life. Besides, the known apparatus cannot be used, if an operation together with narcosis is to be executed. In this case it is not sufficient that the apparatus allows to make oxygen-inhalation and to produce artificial respiration in supplying oxygen, but an apparatus appropriate for these purposes must at all events permit the patient to be narcotized, if it should be necessary. Under certain circumstances, it may even be required to produce artificial respiration in supplying oxygen together with the narcotic.

To unite these different functions in one apparatus acting most surely and to be attended most simply and easily, is the purpose of the present invention.

Figure 9:
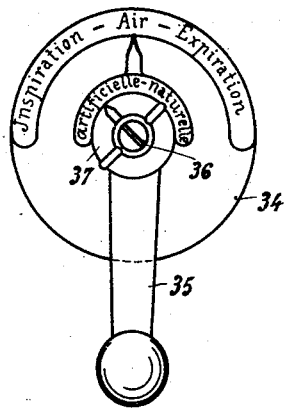
Figure 10:
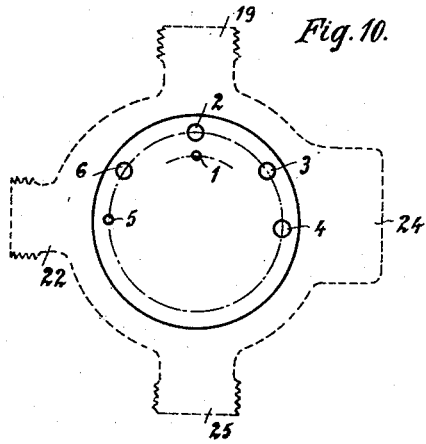
Figure 11:
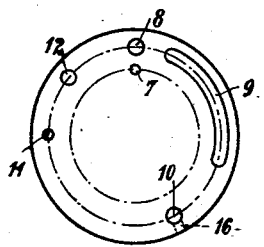
Figure 12:
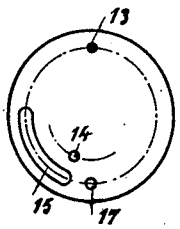

In the accompanying drawings: Figures 1–12 show an apparatus by which especially attempts at restoring life are to be executed, while Figs. 13–23 show an apparatus especially appropriate for operating. It is to be used not only for the mentioned attempts but particularly for narcotizing. Fig. 1 is a view of the first described form of apparatus; Figs. 2–8 show the positions of the cock for different functions, Fig. 9 is a plan of a show-board, and Figs. 10–12 show the manner and disposition of the ways of the cock. In a similar manner is represented in: Fig. 13 a view of the second described form of apparatus; Figs. 14–19 the characteristic positions for the different functions, Fig. 20 the show-board and Figs. 21–23 the disposition of the cock-ways.

In Fig. 1 the multi-ported cock communicates by ducts 19, 20, with a bottle or flask 21 containing oxygen under a suitable pressure, which is to be regulated by means of the reducing valve 27. In this manner it is possible to allow a comparatively feeble current of oxygen, but sufficient for resuscitation, to issue from the gas bottle 21. By the added piece 22, the cock is in communication with a bag 23. At 24 the cock communicates with the atmosphere by an ejector, while duct 25 leads to the mask 26 and to the respiratory organs of the patient. The mask 26, which may fit air tight against the face, is provided with a valve 28 which opens outwards and allows the products of expiration to escape.

The multi-ported cock 29 consists in a cock proper and a show-board. The cock proper (Fig. 2) is composed of the casing 18, the exterior plug 30 and the interior plug 31. The casing is closed below by a cover which presses the plugs against each other and against the casing by means of a spiral-spring. The space 39 between plugs and cover communicates by the port 38 with the press duct 19 in such a manner that it is always filled with oxygen, if duct 19 is opened. The plugs are ground one in another and in the casing and, according to the purpose of the apparatus, provided with bores and ways (Figs. 11 and 12.) Likewise the casing 18 has ports leading to the different ducts (Fig. 10).

The show-board 34 (Fig. 9) is provided with two movable pointers 35 and 36, pointer 35 being fast connected with the exterior plug 30, and pointer 36 with the interior plug 31. The show-board 35 has three designations: "Inspiration"—"Air"—"Expiration". Pointer 35 is provided with a small show-board 37, which has the designations "Artificial"—"Natural." Pointer 36 is to be turned independently with regard to pointer 35, but, being not held fast or turned, pointer 36 turns together with pointer 35, not changing naturally its position as to the small show-board 34.

In the following the different functions practiced by the apparatus, will be described with reference to the accompanying drawings.

1. *Artificial respiration under introduction of oxygen (Figs. 2-4)*. In this case, pointer 35 shows to "Inspiration" and pointer 36 stands in the position: "Artificial". The resulting position of the different parts of the cock 29 is represented by Fig. 2. From duct 19 the oxygen flows through the port 38 into the space below the plugs, and from here through the bores 14, 7 and 1 and duct 25 to the mask 26. The valve 28 is closed so that the oxygen is pressed into the lung of the patient. If expiration is to be induced, pointer 35 is turned to "Expiration" and pointer 36 shows to "Artificial". The ejector 24 communicating with the atmosphere leads to two ports 3 and 4 of the casing. As shown in Figs. 3 and 4, the bore 3 communicates by the ways 9 and 2 with duct 25, the opening 4 is, however, in direct communication with the oxygen-duct by means of the bores 10 and 13 and the radial way 16 (Fig. 4). Therefore, the oxygen flowing through way 13, 10, 16 and 4 into duct 24, will produce here a vacuum and suck in this manner by duct 39, 2 and 25 the inhaled or poisonous gases out of the lung of the patient. In turning pointer 35 regularly from "Inspiration" to "Expiration" and vice versa in intervals corresponding to the phases of natural respiration, the functions of the respiration will be produced in the simplest manner, namely the supply of fresh oxygen into the lung and the evacuation of the inhaled or poisonous gases from the lung.

2. *Inspiration of air and production and reinforcement of expiration (Fig. 5)*.—Furthermore, the apparatus allows the patient to be directly connected with the atmosphere. For this purpose, pointer 35 is turned to the word "Air", and pointer 36 to the designation "Artificial", while the valve 28 of the mask 26 is opened. In this position, mask 26 communicates by means of duct 25, 2, 9, 3 and of the ejector 24 with the atmosphere. In order to induce the expiration, pointer 35 is again turned to the designation "Expiration", by which means the position before described in Figs. 3 and 4, is produced, that is, evacuation of the lung through vacuum. Also in this case, the apparatus is used by turning pointer 35 from "Inspiration" to "Expiration" and vice versa, as described above.

Figure 6:
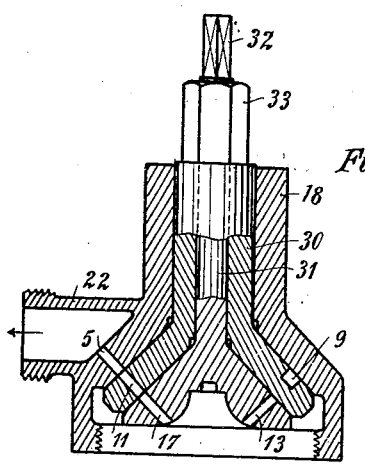
Figure 7:
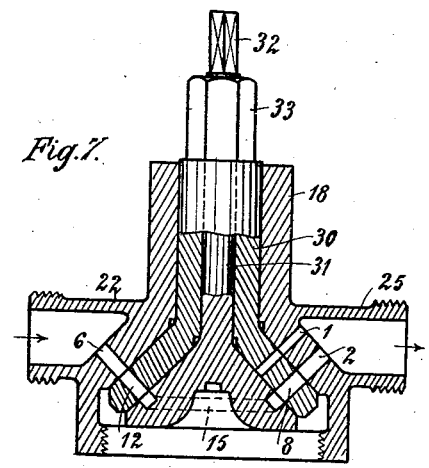
Figure 8:
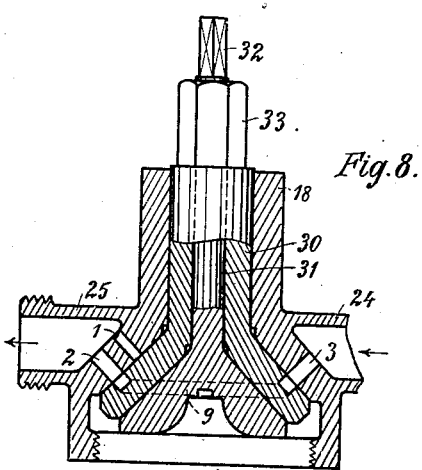

3. *Inhalation of oxygen without artificial evacuation (Figs. 6 and 7)*.—If the patient is supposed to be able to respire without artificial evacuation of the lung, the valve 28 of the mask 26 is opened, pointer 36 is turned to "Natural", and pointer 35 to "Inspiration", by which means the position represented by Figs. 6 and 7, is produced. As results from Fig. 10, the added piece 22 has two ports 5 and 6, of which duct 5 leads from the cock to the bag, and duct 6 from the bag to the cock. As shown in Fig. 6, the oxygen flows through the bores 17, 11, 5 and through nozzle 22 into the bag, at the same time, however, port 6 leading from the bag 23 to the cock 29, communicates by the way 12, 15, 8, 2 and 25 with the mask 26 (Fig. 7). In this manner, the oxygen may be taken from the bag 23 by the patient himself. Whether the patient respires or not, is to be seen by the movements of the bag.

4. *Direct communication of the patient with the atmosphere without artificial evacuation (Fig. 8)*.—If the patient is to be connected with the atmosphere, the mask remaining fitted air-tight against his face, pointer 35 is turned to the designation "Air" and pointer 36 to "Natural", the valve 28 of the mask being opened. By this means, the patient communicates by duct 25, bore 2, way 9, port 3 and ejector 24 with the atmosphere.

As mentioned above, the second modification, shown in Figs. 13–23, represents a further development of the described one, in a manner, that the apparatus can also be used for narcotizing by mixing in the current of oxygen, destined for inspiration, medicaments appropriate for gasification and inspiration, as particularly narcotics. Fig. 13 shows a schematic representation of this modification, 40 being a gas bottle containing compressed oxygen, being provided with a reducing valve 41, allowing the pressure and the supply of oxygen to be regulated. Duct 42 leads to a multi-ported cock 43, and duct 44 represents a vacuum-duct connected with a continuously acting vacuum-pump 45. This pump may be a water injector pump, but it may also be constructed in such a manner that a current of carbonic acid issuing from a gas bottle containing carbonic acid, flows through the nozzle of an ejector, carrying away surrounding air. A further way of the multi-ported cock leads through duct 46 to the mask 47. Duct 48 leads to an apparatus for gasification 49, communicating by duct 50 with a bag 51 connected by duct 52 with the cock. The apparatus for gasification has in its upper end one or more bottles 55 containing medicamental fluids and being closed at their under open parts by cocks 54. With aid of the glass 53 it is possible to observe the number of drops depending on the position of the cocks. At 56 there is another bag connected with the cock by the ducts 57 and 58.

The cock 43 consists of the multi-ported cock proper (Fig. 14) and a show-board connected with the cock. The multi-ported cock is composed of two conical plugs 59 and 60. The plugs are ground one in another and in the casing. The exterior plug 59 is fast connected with pointer 61, so that every turn of pointer 61 produces an exactly corresponding turning of the exterior plug. In a similar way the interior plug 60 is joined with pointer 62 of the show-board so that every turn of pointer 62 will produce a corresponding turning of the interior plug 60. The show-board is provided with three designations "Inspiration-inhalation"—"Air"—"Expiration". Pointer 61 has a small show-board 63 provided with the words: "Inspiration and narcosis"—"Narcosis-inhalation" — "Inspiration" — "Oxygen-inhalation". The pointers are fastened in such a manner as to be surely held fast in the different positions. If pointer 61, that is the exterior plug 59, is turned, the show-board 63 is naturally turned too and generally also pointer 62, that is the interior plug 60. But pointer 62 and the interior plug may be also moved independently as to pointer 61 and the exterior plug 59.

The casing is to be closed in different manners, for example, as represented in Fig. 14, by a cover 64. The interior plug is tightly pressed against the exterior plug 59 by a plate of metal 65, fastened to the exterior plug 59 by set-screws. An external screw 66, fastened to cover 64, presses the plugs one against another and against the casing with aid of a conical spiral-spring. The oxygen enters through duct 42 into the space below the plate of metal 65. The latter one is provided with openings allowing the oxygen to pass into the space above the plate 65 so that, the oxygen duct being opened, the said space is always filled with this gas. The plugs are provided with different annular and radial ways and bores, the disposition of which is shown by Figs. 22 and 23, Fig. 22 representing the exterior plug and Fig. 23 the interior one. In turning the bores and ways of the plugs in different manners against each other and against the ports of the casing, different positions, conduits and communications are produced by which the functions of the apparatus are operated, namely:

1. *Narcosis-inhalation.*—If the patient is to be narcotized, pointer 61 is turned to "Inhalation", while pointer 62 is brought into the position "Narcosis-inhalation". By this means, the oxygen passing through duct 42 to the cock and through the openings of the plate 65 to the space between this one and the interior plug, flows from here through the bores 68, 69, 70 to duct 48 leading to the apparatus for gasification 49 (Fig. 13). Here the current of oxygen carries away the narcotic, enters into the bag 51, flows through duct 52 and the bores 71, 72 into the way 73 of the interior plug 60, from which it flows through the bores 74, 75, the added piece 76 and duct 46 to the mask 47.

2. *Oxygen-inhalation (Fig. 15).*—If narcotizing is to be interrupted and pure oxygen is to be introduced, pointer 61 stands in the position of "Inhalation," while pointer 62 shows to "Oxygen-inhalation". In this case, the oxygen issuing from the space below the plugs filled always with this gas, passes through the openings 77, 78, 79 and duct 57 into the bag 56 from which it flows through duct 58, the way 80, 81, 82, 83, 84 and the pipe 85 to the added piece 76, that is, to the mask 47.

3. *Inspiration and expiration (artificial respiration) under supply of pure oxygen (Figs. 16 and 17).*—If, during the narcosis, it becomes necessary to produce artificial respiration, that is, to introduce oxygen into the lung (inspiration) and to suck out the used or poisonous gases by vacuum (expiration), pointer 61 is to be turned to "Inspiration-inhalation" and pointer 62 to "Inspiration". Fig. 16 represents the resulting position of the cock, the current of oxygen flowing to the added piece 76 through the way 77, 74 and 75 as well as through the bores 91, 89 and 90. It is naturally possible to connect directly the mask of the patient with the atmosphere, by turning the pointer 61 to the word "Air". In this case, the cock is brought into a similar position as described above when describing the other modification (cf. 2 Fig. 5). In order to induce expiration, the pointer 61 is turned to "Expiration" and pointer 62 remains standing on "Inspiration" (Fig. 17). The conduit 76, 75, 92 and 93 allows to connect the mask 47 with the vacuum duct 44, so that the lung of the patient is sucked out by an injector pump or otherwise. By turning the pointer 61 alternately to the position for "Inspiration-inhalation" and "Expiration" in due periods, artificial respiration is produced.

4. *Inspiration and expiration (artificial respiration) under supply of a narcotic (Figs. 18 and 19).*—In order to introduce the narcotic at the same time when producing artificial respiration, as may be necessary in many cases, pointer 61 must be turned to "Inspiration-inhalation" and pointer 62 to the position of "Inspiration and narcosis". As results from Fig. 18, the current of oxygen entering through the bores 91, 69 and 70 into duct 48, flows, as described before, through the apparatus for gasification to the bag 51, from which it passes through the way 52, 71, 72, 86, 74, 75 and 76 to the mask 47. At the same time, another current of pure oxygen passes through the bores 68, 89 and 90 to the mask 47. In order to produce expiration, pointer 61 is turned from "Inspiration-inhalation" to "Expiration", the position of the interior plug staying unchanged in respect to the exterior one. As shown in Fig. 19, the mask 47 communicates by the added piece 76 and the ways 75, 92 and 93 with the vacuum duct, so that the lung is evacuated. In turning again pointer 61 from the position "Inspiration-inhalation" to "Expiration" and vice versa in the periods of the natural respiration, artificial respiration is induced.

As mentioned above, the lung can be pumped out by means of a water injector pump 45 producing a vacuum in duct 44. But the multi-ported cock having appropriate bores, vacuum may be produced in a most simple manner by using the oxygen compressed in the gas bottle. Appropriate bores are drawn on the left side of Fig. 16 with aid of dotted lines. In this case, the interior plug is provided with two interior and radial bores 95 and 98 (cf. Fig. 23). The oxygen issuing from the radial bores 95 and 98 passes through the ports 96 and 97 into duct 99, from which it flows into the vacuum duct 44 where it produces the necessary vacuum by carrying away the surrounding medium.

What I claim and desire to secure by Letters Patent of the United States is:

1. In a combined respirator and inhaler, a multi-ported cock, provided with two plugs ground one in another and in the casing of the cock, the exterior plug being fast connected with a pointer turnable on a show-board, and the interior plug communicating with another pointer movable on another show-board rigidly connected with the first named pointer, the two show-boards having designations corresponding to the functions to be practiced by the apparatus; substantially as and for the purpose set forth.

2. In a combined respirator and inhaler, an oxygen flask, an oxygen service pipe connected thereto, and a reducing valve controlling said pipe, combined with a face-mask, and a multi-ported cock having a pair of concentric apertured plugs that control communication between the service pipe and the face mask, substantially as specified.

3. In a combined respirator and inhaler, an oxygen flask, an oxygen service pipe connected thereto, and a reducing valve controlling said pipe, combined with a face-mask, and a multi-ported cock having a pair of concentric apertured plugs, one of said plugs being provided with two ports that are adapted to establish communication between the service pipe and the face mask, substantially as specified.

4. In a combined respirator and inhaler, an oxygen flask, an oxygen service pipe connected thereto, and a reducing valve controlling said pipe, combined with a bag, a face mask, and a multi-ported cock having a pair of concentric plugs that are adapted to establish communication between the service pipe and the bag, and between the bag and the face mask, substantially as specified.

5. In a combined respirator and inhaler, an oxygen flask, an oxygen service pipe connected thereto, and a reducing valve controlling said pipe, combined with means for gasifying a narcotic, a multi-ported cock having a pair of concentric plugs adapted to establish communication between the oxygen service pipe and said gasifying means, a gas bag, a face mask, and means controlled by said plugs for establishing communication between said bag and face mask, substantially as specified.

6. In a combined respirator and inhaler, an oxygen flask, an oxygen service pipe connected thereto, and a reducing valve controlling said pipe, combined with means for gasifying a narcotic, a multi-ported cock having a pair of concentric plugs adapted to establish communication between the oxygen service pipe and said gasifying means, a gas bag, a face mask, means controlled by said plugs for establishing communication between said bag and face mask, and means also controlled by said plugs for establishing direct communication between the oxygen service pipe and said mask, substantially as specified.

7. In a combined respirator and inhaler, an oxygen flask, an oxygen service pipe connected thereto, and a reducing valve controlling said pipe, combined with a face mask having a valve, a multi-ported cock having a pair of concentric plugs, an ejector, and means controlled by said plugs for connecting said service pipe and face mask to the ejector, substantially as specified.

8. In a combined respirator and inhaler, an oxygen flask, an oxygen service pipe connected thereto, and a reducing valve controlling said pipe, combined with a face mask, a multi-ported cock having a pair of concentric plugs, an ejector having a pair of ducts, and means controlled by said plugs for establishing communication between the service pipe and one of said ducts, and between the face mask and the other duct, substantially as specified.

9. In a combined respirator and inhaler, a face mask, combined with a multi-ported cock having a pair of concentric plugs, and means controlled by said plugs for withdrawing the gaseous contents from said mask, substantially as specified.

Signed by me at Berlin, Germany this 28th day of April 1908.

HEINRICH BRAT.

Witnesses:
WOLDEMAR HAUPT,
HENRY HASPER.